US010454716B2

(12) United States Patent
Wu et al.

(10) Patent No.: US 10,454,716 B2
(45) Date of Patent: Oct. 22, 2019

(54) SOFT-WINDOWING CHANNEL ESTIMATION

(71) Applicant: QUALCOMM Incorporated, San Diego, CA (US)

(72) Inventors: Yongle Wu, San Diego, CA (US); Pengkai Zhao, San Jose, CA (US); Supratik Bhattacharjee, San Diego, CA (US); Amir Farajidana, Sunnyvale, CA (US); Wenshu Zhang, San Diego, CA (US); Michael Lee McCloud, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/841,527

(22) Filed: Dec. 14, 2017

(65) Prior Publication Data

US 2018/0176040 A1 Jun. 21, 2018

Related U.S. Application Data

(60) Provisional application No. 62/435,061, filed on Dec. 15, 2016.

(51) Int. Cl.
| | | |
|---|---|---|
| *H04L 25/20* | (2006.01) | |
| *H04L 25/02* | (2006.01) | |
| *H04L 27/26* | (2006.01) | |
| *H04W 84/04* | (2009.01) | |

(52) U.S. Cl.
CPC ...... *H04L 25/0202* (2013.01); *H04L 25/0216* (2013.01); *H04L 25/0218* (2013.01); *H04L 27/2662* (2013.01); *H04L 27/2665* (2013.01); *H04W 84/045* (2013.01)

(58) Field of Classification Search
CPC ............ H04L 25/0202; H04L 25/0216; H04L 25/0218; H04L 27/2662; H04L 27/2665; H04W 84/045
USPC ........................................................ 370/329
See application file for complete search history.

(56) References Cited

U.S. PATENT DOCUMENTS

| | | | |
|---|---|---|---|
| 7,139,320 B1 | 11/2006 | Singh et al. | |
| 8,275,055 B2 | 9/2012 | Zhang et al. | |
| 8,416,733 B2 * | 4/2013 | Srinivasan | .......... H04L 25/0212 370/210 |
| 8,514,689 B2 | 8/2013 | McCloud | |

(Continued)

FOREIGN PATENT DOCUMENTS

WO WO-2009059249 A2 5/2009

OTHER PUBLICATIONS

International Search Report and Written Opinion—PCT/US2017/066605—ISA/EPO—dated Apr. 9, 2018.

*Primary Examiner* — Stephen J Clawson
(74) *Attorney, Agent, or Firm* — Patterson & Sheridan, LLP

(57) ABSTRACT

Certain aspects of the present disclosure relate to techniques for estimating a channel using soft-windowing. A user equipment (UE) may determine, based on a cyclic prefix (CP) length of a channel, a timing window for sampling reference signals transmitted on the channel, determine a set of weights to apply to samples obtained within the determined timing window, wherein each weight corresponds to a sample obtained within the determined window, and estimate the channel by applying the weights to the samples.

16 Claims, 7 Drawing Sheets

(56) References Cited

U.S. PATENT DOCUMENTS

| | | |
|---|---|---|
| 2007/0110172 A1 | 5/2007 | Faulkner et al. |
| 2013/0322586 A1 | 12/2013 | Tabet et al. |
| 2016/0316445 A1* | 10/2016 | Abdi .................... H04L 27/2665 |
| 2017/0163457 A1* | 6/2017 | Futatsugi ................ H04B 1/16 |
| 2018/0367362 A1* | 12/2018 | Sun ........................ H04L 27/34 |

* cited by examiner

SOFT-WINDOWING CHANNEL ESTIMATION

CROSS-REFERENCE TO RELATED APPLICATIONS

The present Application for Patent claims priority to U.S. Provisional Application No. 62/435,061, filed Dec. 15, 2016, which is assigned to the assignee of the present application and hereby expressly incorporated by reference herein in its entirety.

BACKGROUND

Field of the Disclosure

The present disclosure relates generally to wireless communication, and more particularly, to techniques for using soft-windowing to estimate a channel.

Description of the Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

SUMMARY

Techniques for configuring estimating a channel using soft-windowing are described herein.

In accordance with an aspect, a method for wireless communications by a user equipment (UE) is disclosed. The method generally includes determining, based on a cyclic prefix length of a channel, a timing window for sampling reference signals transmitted on the channel, determining a set of weights to apply to samples obtained within the determined timing window, and estimating the channel by applying the weights to the samples.

In accordance with an aspect, an apparatus for wireless communications is disclosed. The apparatus generally includes a processing system configured to determine, based on a cyclic prefix length of a channel, a timing window for sampling reference signals transmitted on the channel, to determine a set of weights to apply to samples obtained within the determined timing window, and to estimate the channel by applying the weights to the samples, and a memory coupled with the processing system.

In accordance with an aspect, an apparatus for wireless communications is disclosed. The apparatus generally includes means for determining, based on a cyclic prefix length of a channel, a timing window for sampling reference signals transmitted on the channel, means for determining a set of weights to apply to samples obtained within the determined timing window, and means for estimating the channel by applying the weights to the samples.

In accordance with an aspect, a computer-readable medium for wireless communications is disclosed. The computer-readable medium comprises instructions that, when executed by a processor, cause the processor to perform operations including determining, based on a cyclic prefix length of a channel, a timing window for sampling reference signals transmitted on the channel, determining a set of weights to apply to samples obtained within the determined timing window, and estimating the channel by applying the weights to the samples.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
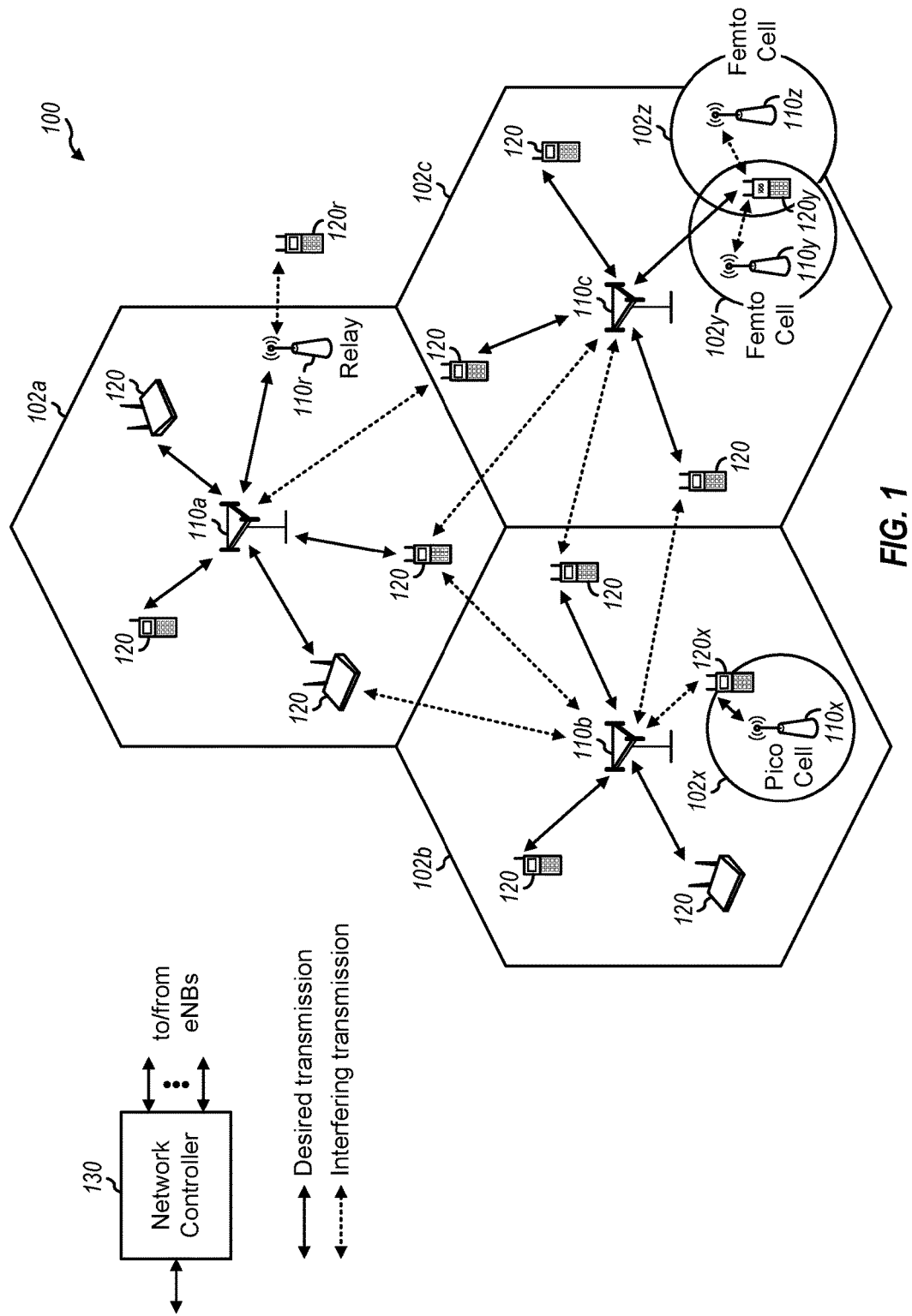
FIG. 1 is a block diagram conceptually illustrating an example of a telecommunications system in accordance with an aspect of the present disclosure.

Physical broadcast channel (PBCH) estimation, and other types of channel estimation, starts with a receiver obtaining a raw time-domain channel impulse response (i.e., CIR, which has N continuous samples or taps, for example, N=32), and applying a windowing function to prune noise samples. Note that such time-domain CIR may be derived from cell-specific reference signal (CRS) tones of the center 8 resource blocks (RBs) of a system bandwidth, and that so called narrow-band CIR may be different from wideband CRS side CIR.

According to aspects of the present disclosure, a receiving device may use a soft-windowing solution applied on top of raw CIR in estimating a channel, such as a PBCH. The soft-windowing solution may include the following two techniques: a programmable window mask technique that controls the maximum allowable delay or timing of a true channel path of the channel being estimated; and a soft thresholding technique that assigns weight to each sample or tap based on a likelihood of the sample being a true channel path versus a likelihood of the sample being noise.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a block diagram conceptually illustrating an example of a telecommunications network system 100 in which an aspects of the present disclosure may be practiced. For example, the telecommunications network system 100 may be an LTE network. The telecommunications network system 100 may include a number of evolved NodeBs (eNodeBs) 110 and user equipment (UEs) 120 and other network entities. An eNodeB 110 may be a station that communicates with the UEs 120 and may also be referred to as a base station, an access point, etc. A NodeB is another example of a station that communicates with the UEs 120. An eNodeB or NodeB may perform operations 1100, set forth in FIG. 11, in accordance with aspects of the present disclosure. Similarly, a UE may perform operations 1300, set forth in FIG. 13, in accordance with aspects of the present disclosure.

Each eNodeB 110 may provide communication coverage for a particular geographic area. In 3GPP, the term "cell" can refer to a coverage area of an eNodeB 110 and/or an eNodeB subsystem serving the coverage area, depending on the context in which the term is used.

An eNodeB 110 may provide communication coverage for a macro cell, a pico cell, a femto cell, and/or other types of cell. A macro cell may cover a relatively large geographic area (e.g., several kilometers in radius) and may allow unrestricted access by UEs 120 with service subscription. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 may be subscribed to a Closed Subscriber Group (CSG), UEs 120 for users in the home, etc.). An eNodeB 110 for a macro cell may be referred to as a macro eNodeB. An eNodeB 110 for a pico cell may be referred to as a pico eNodeB. An eNodeB 110 for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB 110 may provide communication coverage for one or more (e.g., three) cells.

The telecommunications network system 100 may include one or more relay stations 110r and 120r, that may also be referred to as a relay eNodeB, a relay, etc. The relay station 110r may be a station that receives a transmission of data and/or other information from an upstream station (e.g., an eNodeB 110 or a UE 120) and sends the received transmission of the data and/or other information to a downstream station (e.g., a UE 120 or an eNodeB 110). The relay station 120r may be a UE that relays transmissions for other UEs (not shown). In the example shown in FIG. 1, the relay station 110r may communicate with the eNodeB 110a and the UE 120r in order to facilitate communication between the eNodeB 110a and the UE 120r. Relay stations 110r and 120r may perform operations 1100, set forth in FIG. 11, and/or operations 1300, set forth in FIG. 13, in accordance with aspects of the present disclosure.

The telecommunications network system 100 may be a heterogeneous network that includes eNodeBs 110 of different types, e.g., macro eNodeBs 110a-c, pico eNodeBs 110x, femto eNodeBs 110y-z, relay stations 110r, etc. These different types of eNodeBs 110 may have different transmit power levels, different coverage areas, and different impact on interference in the telecommunications network system 100. For example, macro eNodeBs 110a-c may have a high transmit power level (e.g., 20 Watts) whereas pico eNodeBs 110x, femto eNodeBs 110y-z and relays 110r may have a lower transmit power level (e.g., 1 Watt).

The telecommunications network system 100 may support synchronous or asynchronous operation. For synchronous operation, the eNodeBs 110 may have similar frame timing, and transmissions from different eNodeBs 110 and may be approximately aligned in time. For asynchronous operation, the eNodeBs 110 may have different frame timing, and transmissions from different eNodeBs 110 and may not be aligned in time. The techniques described herein may be used for both synchronous and asynchronous operation.

A network controller 130 may be coupled to a set of eNodeBs 110 and provide coordination and control for these eNodeBs 110. The network controller 130 may communicate with the eNodeBs 110 via a backhaul (not shown). The eNodeBs 110 may also communicate with one another, e.g., directly or indirectly via wireless or wire line backhaul (e.g., X2 interface) (not shown).

The UEs 120 (e.g., 120x, 120y, etc.) may be dispersed throughout the telecommunications network system 100, and each UE 120 may be stationary or mobile. For example, the UE 120 may be referred to as a terminal, a mobile station, a subscriber unit, a station, etc. In another example, the UE 120 may be a cellular phone, a personal digital assistant (PDA), a wireless modem, a wireless communication device, a handheld device, a laptop computer, a cordless phone, a wireless local loop (WLL) station, a tablet, a netbook, a smart book, etc. The UE 120 may be able to communicate with macro eNodeBs 110a-c, pico eNodeBs 110x, femto eNodeBs 110y-z, relays 110r, etc. For example, in FIG. 1, a solid line with double arrows may indicate desired transmissions between a UE 120 and a serving eNodeB 110, which is an eNodeB 110 designated to serve the UE 120 on the downlink and/or uplink. A dashed line with double arrows may indicate interfering transmissions between a UE 120 and an eNodeB 110.

LTE may utilize orthogonal frequency division multiplexing (OFDM) on the downlink and single-carrier frequency division multiplexing (SC-FDM) on the uplink. OFDM and SC-FDM may partition the system bandwidth into multiple (K) orthogonal subcarriers, which are also commonly referred to as tones, bins, etc. Each subcarrier may be modulated with data. In general, modulation symbols may be sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
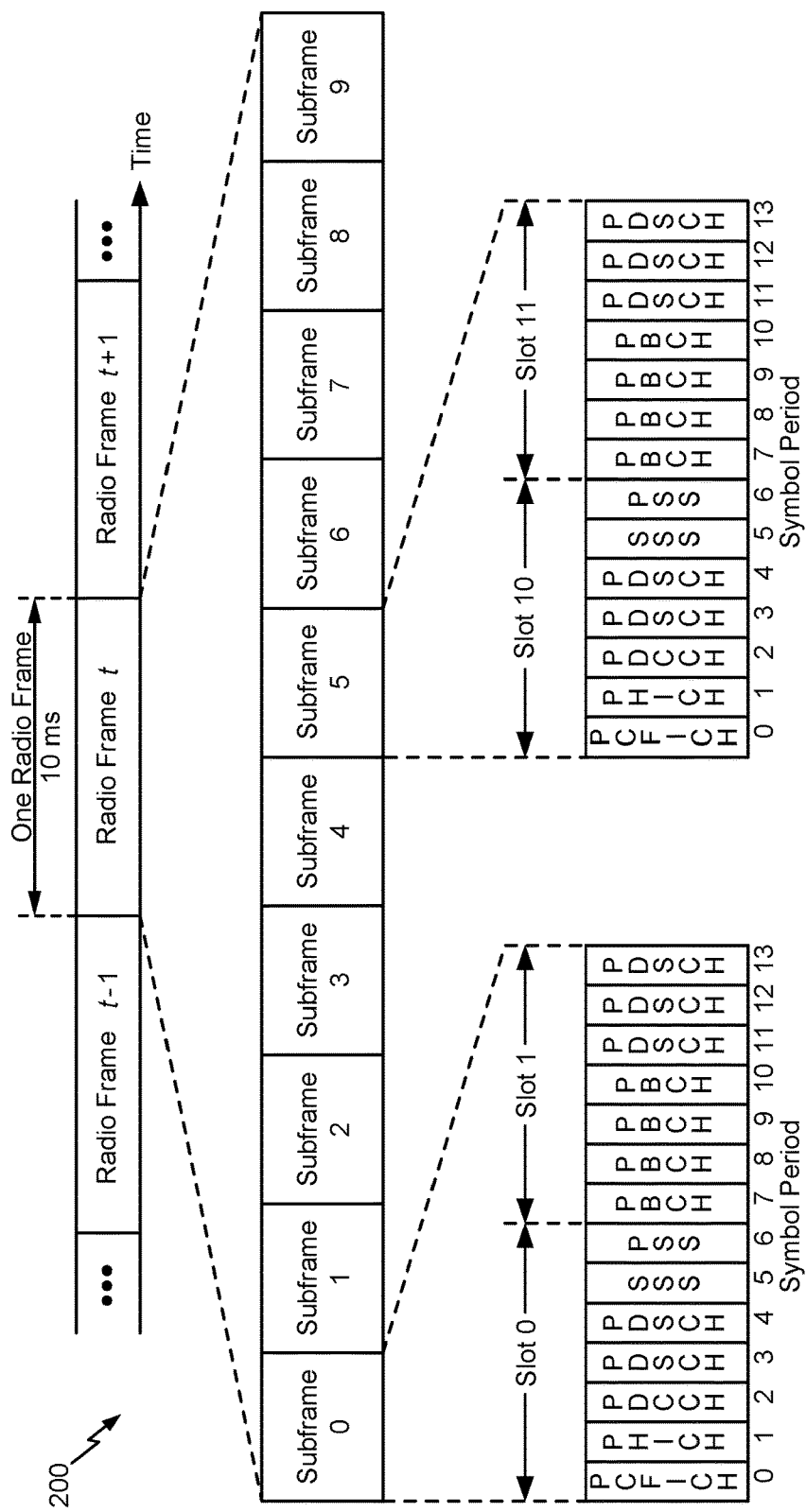
FIG. 2 is a block diagram conceptually illustrating an example of a down link frame structure in a telecommunications system in accordance with an aspect of the present disclosure.

FIG. 2 is a block diagram conceptually illustrating an example of a downlink frame structure in a telecommunications system in accordance with an aspect of the present disclosure. The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix (not shown). The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, for example, an eNodeB may send a primary synchronization signal (PSS) and a secondary synchronization signal (SSS) for each cell in the coverage area of the eNodeB. The primary synchronization signal (PSS) and secondary synchronization signal (SSS) may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send system information in a Physical Broadcast Channel (PBCH) in symbol periods 0 to 3 of slot 1 of subframe 0.

The eNodeB may send information in a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send information in a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it may be understood that the PDCCH and PHICH are also included in the first symbol period. Similarly, the PHICH and PDCCH are also both in the second and third symbol periods, although not shown that way in FIG. 2. The eNodeB may send information in a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH around the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs in the coverage area. The eNodeB may send the PDCCH in a unicast manner to specific UEs in the coverage area. The eNodeB may also send the PDSCH in a unicast manner to specific UEs in the coverage area.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage areas of multiple eNodeBs. One of these eNodeBs may be selected to serve the UE. The serving eNodeB may be selected based on various criteria such as received power, path loss, signal-to-noise ratio (SNR), etc.

Figure 3:
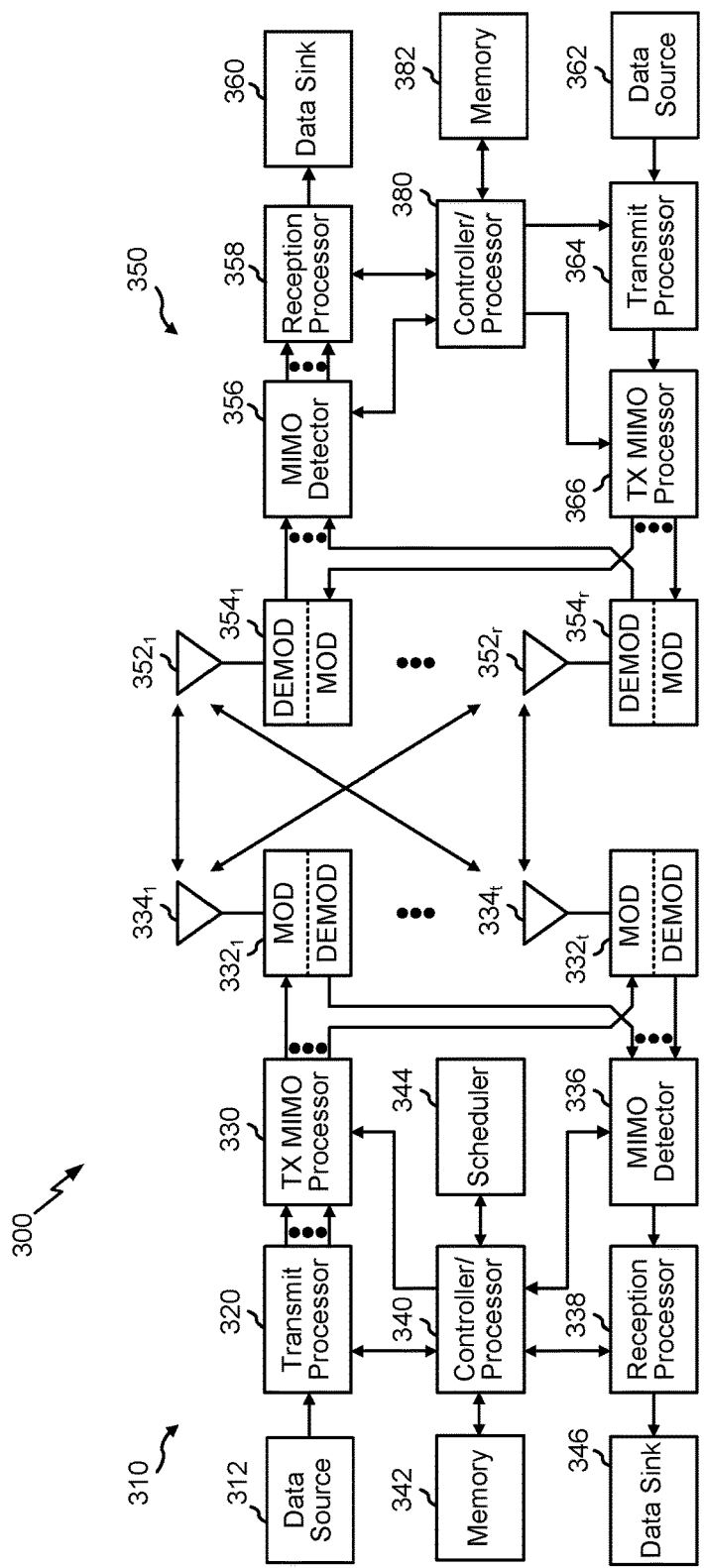
FIG. 3 is a block diagram conceptually illustrating an exemplary eNodeB and an exemplary UE configured in accordance with an aspect of the present disclosure.

FIG. 3 is a block diagram conceptually illustrating an exemplary eNodeB 310 and an exemplary UE 350 configured in accordance with an aspect of the present disclosure. For example, the base station/eNodeB 310 and the UE 350, as shown in FIG. 3, may be one of the base stations/eNodeBs 110 and one of the UEs 120 in FIG. 1. The base station 310 may be equipped with antennas $334_{1-t}$, and the UE 350 may be equipped with antennas $352_{1-r}$, wherein t and r are integers greater than or equal to one.

At the base station 310, a base station transmit processor 320 may receive data from a base station data source 312 and control information from a base station controller/processor 340. The control information may be carried on the PBCH, PCFICH, PHICH, PDCCH, etc. The data may be carried on the PDSCH, etc. The base station transmit processor 320 may process (e.g., encode and symbol map) the data and control information to obtain data symbols and control symbols, respectively. The base station transmit processor 320 may also generate reference symbols, e.g., for the PSS, SSS, and cell-specific reference signal (RS). A base station transmit (TX) multiple-input multiple-output (MIMO) processor 330 may perform spatial processing (e.g., precoding) on the data symbols, the control symbols, and/or the reference symbols, if applicable, and may provide output symbol streams to the base station modulators/demodulators (MODs/DEMODs) $332_{1-t}$. Each base station MOD/DEMOD 332 may process a respective output symbol stream (e.g., for OFDM, etc.) to obtain an output sample stream. Each base station modulator/demodulator 332 may further process (e.g., convert to analog, amplify, filter, and upconvert) the output sample stream to obtain a downlink signal. Downlink signals from modulators/demodulators $332_{1-t}$ may be transmitted via the antennas $334_{1-t}$, respectively.

At the UE 350, the UE antennas $352_1$, may receive the downlink signals from the base station 310 and may provide received signals to the UE modulators/demodulators (MODs/DEMODs) $354_{1-r}$, respectively. Each UE MOD/DEMOD 354 may condition (e.g., filter, amplify, downconvert, and digitize) a respective received signal to obtain input samples. Each UE modulator/demodulator 354 may further process the input samples (e.g., for OFDM, etc.) to obtain received symbols. A UE MIMO detector 356 may obtain received symbols from all the UE modulators/demodulators $354_{1-r}$, and perform MIMO detection on the received symbols if applicable, and provide detected symbols. A UE reception processor 358 may process (e.g., demodulate, deinterleave, and decode) the detected symbols, provide decoded data for the UE 350 to a UE data sink 360, and provide decoded control information to a UE controller/processor 380.

On the uplink, at the UE 350, a UE transmit processor 364 may receive and process data (e.g., for the PUSCH) from a UE data source 362 and control information (e.g., for the PUCCH) from the UE controller/processor 380. The UE transmit processor 364 may also generate reference symbols for a reference signal. The symbols from the UE transmit processor 364 may be precoded by a UE TX MIMO processor 366 if applicable, further processed by the UE modulator/demodulators $354_{1-r}$, (e.g., for SC-FDM, etc.), and transmitted to the base station 310. At the base station 310, the uplink signals from the UE 350 may be received by the base station antennas 334, processed by the base station modulators/demodulators 332, detected by a base station MIMO detector 336 if applicable, and further processed by a base station reception processor 338 to obtain decoded data and control information sent by the UE 350. The base station reception processor 338 may provide the decoded data to a base station data sink 346 and the decoded control information to the base station controller/processor 340.

The base station controller/processor 340 and the UE controller/processor 380 may direct the operation at the base station 310 and the UE 350, respectively. The base station controller/processor 340 and/or other processors and modules at the base station 310 may perform or direct, e.g., the execution of various processes for the techniques described herein. For example, the base station controller/processor 340 may perform or direct the operations 1100 set forth in FIG. 11. The UE controller/processor 380 and/or other processors and modules at the UE 350 may also perform or direct, e.g., the execution of the operations 1300 set forth in FIG. 13, and/or other processes for the techniques described herein. The base station memory 342 and the UE memory 382 may store data and program codes for the base station 310 and the UE 350, respectively. A scheduler 344 may schedule UEs 350 for data transmission on the downlink and/or uplink.

In one configuration, the base station 310 may include means for generating a compact Downlink Control Information (DCI) for at least one of uplink (UL) or downlink (DL) transmissions, wherein the compact DCI comprises a reduced number of bits when compared to certain standard DCI formats; and means for transmitting the DCI. In one aspect, the aforementioned means may be the base station controller/processor 340, the base station memory 342, the base station transmit processor 320, the base station modulators/demodulators 332, and the base station antennas 334 configured to perform the functions recited by the aforementioned means. In another aspect, the aforementioned means may be a module or any apparatus configured to perform the functions recited by the aforementioned means. In one configuration, the UE 350 may include means for receiving compact Downlink Control Information (DCI) for at least one of uplink (UL) or downlink (DL) transmissions, wherein the DCI comprises a reduced number of bits of a standard DCI format; and means for processing the DCI. In one aspect, the aforementioned means may be the UE controller/processor 380, the UE memory 382, the UE reception processor 358, the UE MIMO detector 356, the UE modulators/demodulators 354, and the UE antennas 352 configured to perform the functions recited by the aforementioned means. In another aspect, the aforementioned means may be a module or any apparatus configured to perform the functions recited by the aforementioned means.

Figure 4:
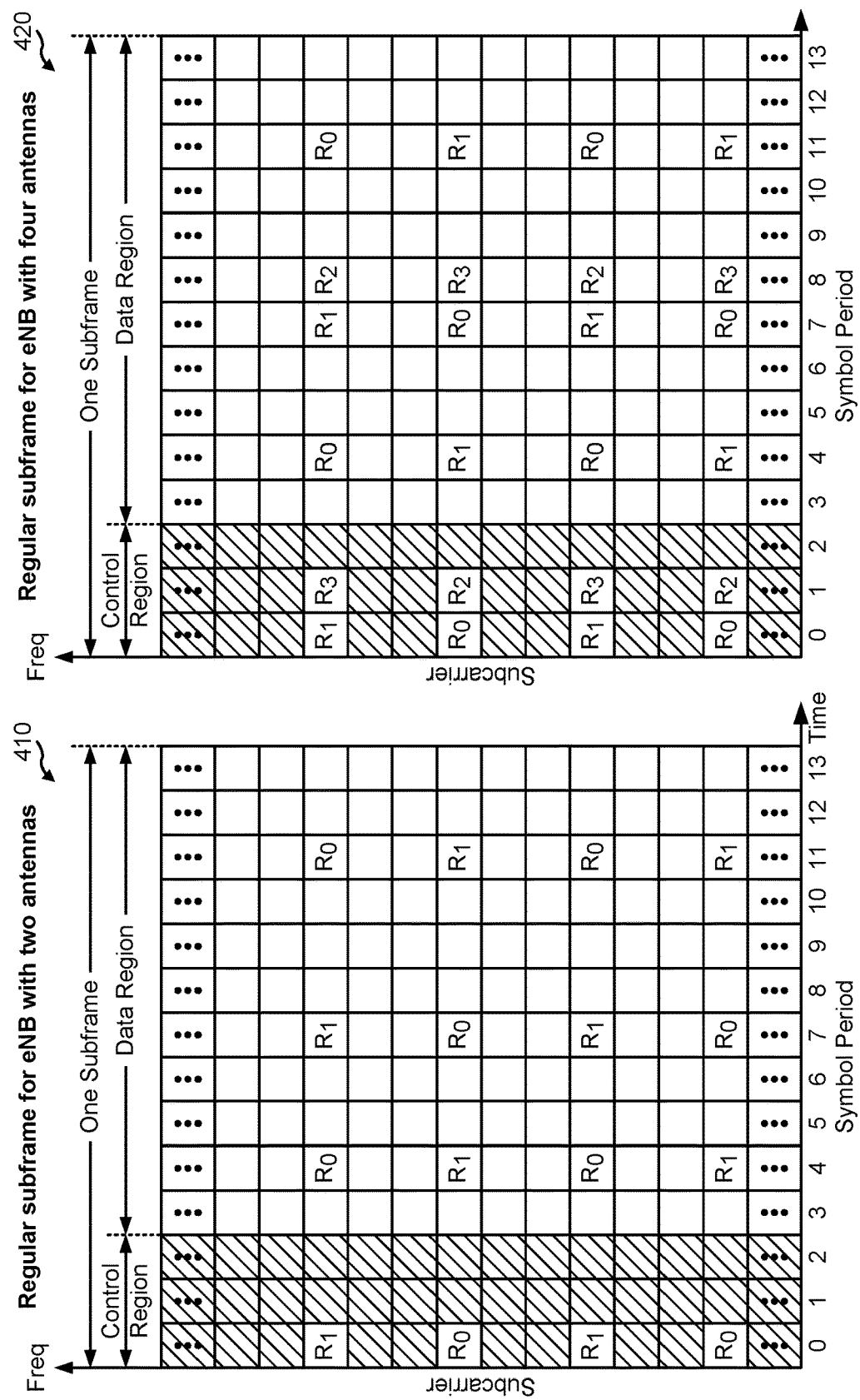
FIG. 4 illustrates various exemplary subframe resource element mappings, in accordance with aspects of the present disclosure.

FIG. 4 illustrates various exemplary subframe resource element mappings in accordance with an aspect of the present disclosure. For example, FIG. 4 illustrates two exemplary subframe formats 410 and 420 for the downlink with the normal cyclic prefix. The available time frequency resources for the downlink may be partitioned into resource blocks. Each resource block may include 12 subcarriers in one slot and may include a number of resource elements. Each resource element may correspond to one subcarrier in one symbol period and may be used to send one modulation symbol, which may be a real or complex value.

The subframe format 410 may be used for an eNodeB equipped with two antennas. A common reference signal (CRS) may be transmitted from antennas 0 and 1 in symbol periods 0, 4, 7 and 11. A common reference signal (CRS) is a signal that is known a priori by a transmitter and a receiver and may also be referred to as a pilot signal. A common reference signal (CRS) may be a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. The subframe format 420 may be used for an eNodeB equipped with four antennas. A common reference signal (CRS) may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNodeBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in a communication network (e.g., LTE network). For example, Q interlaces with indices of 0 through Q−1 may be defined, where Q may be equal to 4, 6, 8, 10, or some other value. Each interlace may include subframes that may be spaced apart by Q subframes. In particular, interlace q may include subframes q, q+Q, q+2Q, etc., where $q \in (0, 1, \ldots, Q-1)$.

The wireless communication network may support hybrid automatic retransmission (HARQ) for data transmission on the downlink and uplink. For HARQ, a transmitter (e.g., at an eNodeB) may send one or more transmissions of a data packet until the data packet is decoded correctly by a receiver (e.g., at a UE) or some other termination condition is encountered. For synchronous HARQ, all transmissions of the data packet may be sent in subframes of a single interlace. For asynchronous HARQ, each transmission of the data packet may be sent in any subframe.

A UE may be located within the geographic coverage area of multiple eNodeBs. One of the eNodeBs may be selected to serve the UE and may be called "serving eNodeB," while other eNodeB(s) may be called "neighboring eNodeB(s)." The serving eNodeB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more neighboring eNodeBs.

Example Soft-Windowing Operations

PBCH channel (and other types of channels) estimation starts with a receiver obtaining a raw time-domain channel impulse response (i.e., CIR, which has N continuous samples or taps, for example, N=32), and applying a windowing function to prune noise samples. Note that such time-domain CIR may be derived from CRS tones of the center 8 RBs of a system bandwidth, and that so called narrow-band CIR may be different from wideband CRS side CIR.

According to aspects of the present disclosure, a receiving device (e.g., UE 120 shown in FIG. 1) may use a soft-windowing solution applied on top of raw CIR in estimating a channel, such as a PBCH. The soft-windowing solution may include the following two techniques: a programmable window mask technique that controls the maximum allowable delay/timing of a true channel path of the channel being estimated; and a soft thresholding technique that assigns weight to each sample or tap based on a likelihood of the sample being a true channel path versus a likelihood of the sample being noise.

Aspects of the present disclosure may be practiced to improve PBCH (and other channel) decoding performance. The disclosed soft thresholding techniques may be used to prune noise taps and improve decoding performance of a receiver, especially under conditions of low signal to noise ratio (SNR) that may be caused by additive white Gaussian noise (AWGN) and fading channels. The disclosed programmable window mask or timing window may improve robustness of the decoding process in non-ideal timing conditions, because the programmable window mask may tolerate a range of non-ideal cell/channel timing that is larger than ranges tolerated in previously known techniques.

A previously known technique for estimating PBCH uses a static window timing based on cell timing information, sometimes referred to as brick-wall windowing. In this technique, a legacy receiver generates a 32-tap (i.e., 32-sample) narrowband (NB) channel estimate of the PBCH. A 7-tap brick-wall window (based on the CP-length in the channel estimation domain) is applied to the set of 32 taps with a target channel tap (i.e., sample) of the 32 taps at the center of the 7-tap window. The target channel tap is selected based on cell timing information from search or time tracking loop (TTL) adjustment.

Static (e.g., based on one set of timing information) brick-wall windowing may fail under some conditions. For example, static brick-wall windowing may fail if timing information from a previous search(es) has gone stale, such that a receiver is out of synchronization with a transmitter. In a second example, static brick-wall windowing may fail if a wide-band TTL of a receiver is converging and is not yet accurate enough to allow the receiver to select a correct target channel sample. In a third example, static brick-wall windowing may fail if, for a multi-path fading channel, a searcher (e.g., a receiver) locks onto a weaker non-ideal path. When a receiver is attempting to receive a multi-path fading channel, the receiver may lock on to a weaker non-ideal path with low, but non-zero, probability.

According to aspects of the present disclosure, a receiver may use a programmable soft-windowing technique that prunes raw channel impulse response (CIR) samples (i.e., taps) jointly through a window mask (e.g., a timing window) and soft tap thresholding.

Figure 5:
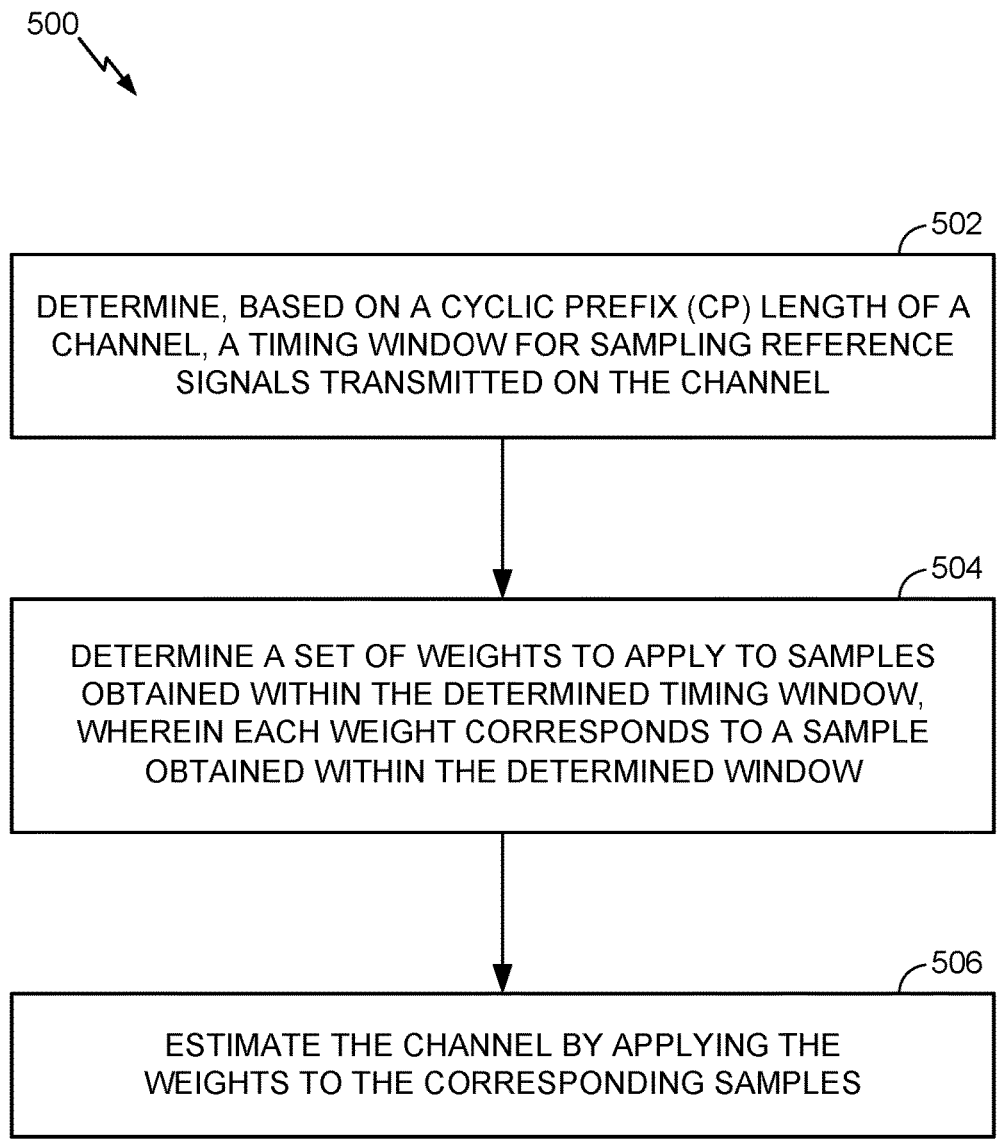
FIG. 5 illustrates example operations, performed by a user equipment (UE), in accordance with aspects of the present disclosure

FIG. 5 sets forth example operations 500, performed, for example, by a user equipment (UE) (e.g., UE 120 shown in FIG. 1) or other device for using soft-windowing techniques to estimate a channel, in accordance with aspects of the present disclosure.

Operations 500 may begin, at block 502, by the UE determining, based on a cyclic prefix length of a channel, a timing window for sampling reference signals transmitted on the channel. For example, UE 120 (see FIG. 1) determines, based on a downlink channel from a base station (e.g., BS 110*a* in FIG. 1) having a normal cyclic prefix length, a timing window (e.g., the window shown in FIG. 6C, described below) for sampling reference signals on the downlink channel.

At block 504, operations 500 continue by the UE determining a set of weights to apply to samples obtained within the determined timing window, wherein each weight corresponds to a sample obtained within the determined window. Continuing the example from above, the UE 120 determines a set of weights (e.g., {1.0, 0.75, 0.5, 0.25, 0.0}) to apply to samples obtained within the timing window determined in block 502 above, wherein each weight corresponds to a sample obtained within the determined timing window.

Operations 500 may continue at block 506 by the UE estimating the channel by applying the weights to the corresponding samples. Still in the example from above, the UE 120 estimates the channel by multiplying the determined set of weights from block 504 to the corresponding samples obtained within the timing window determined in block 502 above.

According to aspects of the present disclosure, the timing window may be determined based on a maximum allowable delay of a true channel path of the channel.

In aspects of the present disclosure, the timing window may be determined based on a cyclic prefix (CP) length of the channel.

According to aspects of the present disclosure, the channel impulse response (CIR) of a PBCH NB path channel estimate for transmit port p and receive port q may be represented by $h_1^{p,\,q}, h_2^{p,\,q}, h_3^{p,\,q}, \ldots, h_N^{p,\,q}$, where N=32 for PBCH channel estimation in a narrow-band. The corresponding channel energy response (CER) may be represented by $S_n^{p,\,q} = |h_n^{p,\,q}|^2$ for n=1, 2, 3, ..., N.

According to aspects of the present disclosure, a soft-windowing technique is provided that includes applying a weight value $w_n^{p,\,q}$ to CIR values $h_n^{p,\,q}$, to determine a set of final CIR values to be used, $\hat{h}_n^{p,\,q}$, i.e., $\hat{h}_n^{p,\,q} = w_n^{p,\,q} h_n^{p,\,q}$. The weights $w_n^{p,\,q}$ are calculated based on CER, $S_n^{p,\,q}$, as explained below.

For clarity in the following description, the port information (p and q) is omitted, while the CER is represented as S and the output windowing coefficients (e.g., weights) are represented as w. However, this is a representation for the sake of clarity only, and the soft-windowing weights and outputs are independently calculated and applied for each combination of transmit port and receive port.

Weights used in soft-windowing are calculated based on a set of thresholds determined based on average CER and a window mask penalizing the taps (e.g., samples) that are further away from a reference cell timing than taps near the reference cell timing. Calculating the weights may begin with calculating a mean CER as $$s = \frac{1}{N}\sum_n S_n.$$

Next, a window mask (e.g., a timing window) may be applied on top of a CER for each sample, as $S'_n = \alpha_n S_n$. Here parameter $\alpha_n$ represents the window mask values. Lastly, an exemplary set of final weights in soft-windowing may be calculated according to this function:

$$w_n = \begin{cases} 1.00, & \text{if } S'_n \geq \tau_1 s \\ 0.75, & \text{if } \tau_1 s > S'_n \geq \tau_2 s \\ 0.5, & \text{if } \tau_2 s > S'_n \geq \tau_3 s \\ 0.25, & \text{if } \tau_3 s > S'_n \geq \tau_4 s \\ 0, & \text{if } \tau_4 s > S'_n \end{cases}$$

The weight function above and the values determined for the weights are exemplary. According to aspects of the present disclosure, weights may take any real value and may be determined based on window values $\alpha_n$ and thresholds $\tau_k$. Parameters $\alpha_n$ and $\tau_k$ may be programmed in advance on a UE or determined by calculations. Exemplary values of $\alpha_n$ and $\tau_k$ are given below.

Values of the window mask $\alpha_n$ (n=1, 2, ..., 32) are selected to penalize the taps further away from a reference cell timing as compared to taps near the reference cell timing. For normal cyclic prefix (NCP) channels, an exemplary set of weights $\alpha$={1, 1, 1, 1, 1, 1, 1, 0.75, 0.75, 0.75, 0.5, 0.5, 0.5, 0.25, 0.25, 0.25, 0, 0, 0, 0, 0, 0, 0.25, 0.25, 0.25, 0.5, 0.5, 0.5, 0.75, 0.75, 0.75} may be used in the disclosed techniques. This set of weights was determined based on extending +/−CP/2 window (e.g., the window of static brick-wall windowing) to roughly 4× its size to each side, with decaying weights as the distance from the center increases.

According to aspects of the present disclosure, any real value may be included in a window mask. According to aspects of the present disclosure, a set of window masks should have a same number of elements as a number of samples taken from a channel to be estimated.

A set of programmable threshold values, e.g., $\{\tau_1, \tau_2, \tau_3, \tau_4\}$, may be used in calculating the final weights to be used in the disclosed techniques. An exemplary set of threshold values are $\{\tau_1=6.3, \tau_2=4.0, \tau_3=2.0, \tau_4=1.33\}$. However, the disclosure is not so limited, and both other threshold values and sets of threshold values of different sizes are included in the disclosure. For example, a set of two threshold values $\{\tau_1=4.0, \tau_2=2.0\}$ may be used, and the final weights determined as 1.00 if $S'_n \geq \tau_1{}^s$, 0.5 if $\tau_1{}^s > S'_n \geq \tau_2{}^s$, and 0 if $\tau_2{}^s > S'_n$.

Figure 6A:
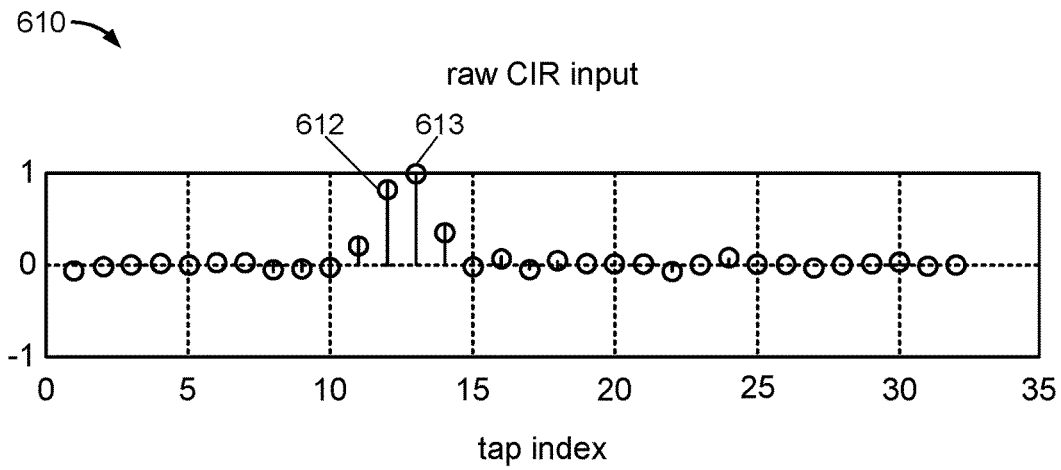
FIGS. 6A-C illustrate examples of channel impulse response samples and windowing techniques, in accordance with aspects of the present disclosure.
Figure 6B:
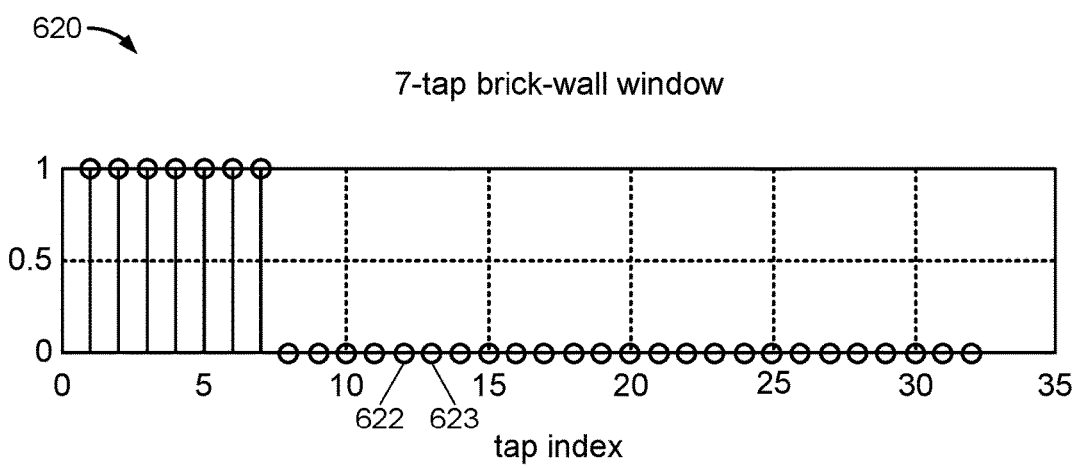
Figure 6C:
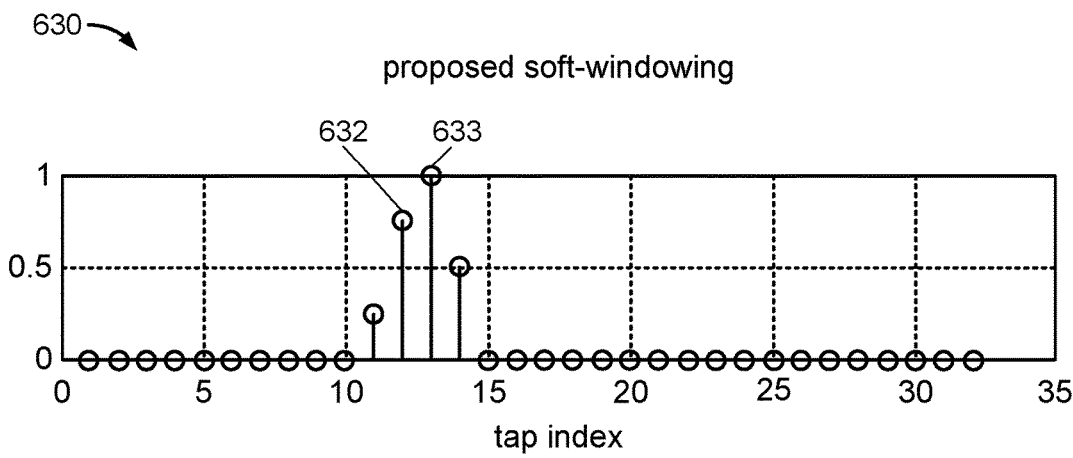

FIGS. 6A-C illustrate examples of raw CIR input 610 to a UE (e.g., UE 120 shown in FIG. 1), a legacy 7-tap brick-wall window 620, and a soft-windowing technique 630 in accordance with aspects of the present disclosure. In the exemplary CIR input, the timing of the UE does not match the timing of the transmitter (e.g., a BS), and the peak samples are the samples at 612 and 613 (samples 12 and 13). As can be seen when multiplying the raw input 610 by values of the 7-tap brick-wall window 620, a UE using previously known techniques may fail to decode a channel with the CIR 610, due to the brick-wall window not being aligned with the timing of the transmitter. When the raw input 610 is multiplied by the values of the 7-tap brick-wall window 620, the peak samples 612 and 613 are reduced to zero values by being multiplied by the corresponding values of the brick wall window at 622 and 623, which are zero. A UE using the exemplary soft-windowing technique 630 may successfully decode a channel, such as that associated with the raw CIR input 610, while still being able to reject noise. When the raw input 610 is multiplied by the values of the soft-windowing technique 630, the peak samples 612 and 613 are still the peak values after being multiplied by the corresponding values at 632 and 633.

Aspects of the present disclosure may be applied in various PBCH scenarios, including initial acquisition of a PBCH, receiving PBCH from a serving cell, receiving PBCH from a neighboring cell, and receiving PBCH from an interfering cell.

For comparison purposes, existing legacy (e.g., previously known) PBCH channel estimation uses 7-tap brick-wall window, which can be defined as:

$w_n=1.0$, for n=1, 2, 3, 4, 5, 6, 7; and
$w_n=0.0$, for the remaining taps (e.g., n=8, . . . , 32).

Aspects of the present disclosure may improve both PBCH decoding performance and robustness against non-ideal timing, as compared to previously known techniques.

According to aspects of the present disclosure, a receiver using soft thresholding may dynamically apply proper weights, based on a likelihood of each tap being near the proper timing.

According to aspects of the present disclosure, a receiver using soft thresholding may prune noise taps and improve PBCH decoding performance under low SNR (e.g., −10 dB), AWGN, and fading, especially extended typical urban model (ETU) 300 and ETU800 cases defined in 3GPP standards.

According to aspects of the present disclosure, a receiver using a window mask may tolerate a programmable amount of timing inaccuracy.

Figure 7:
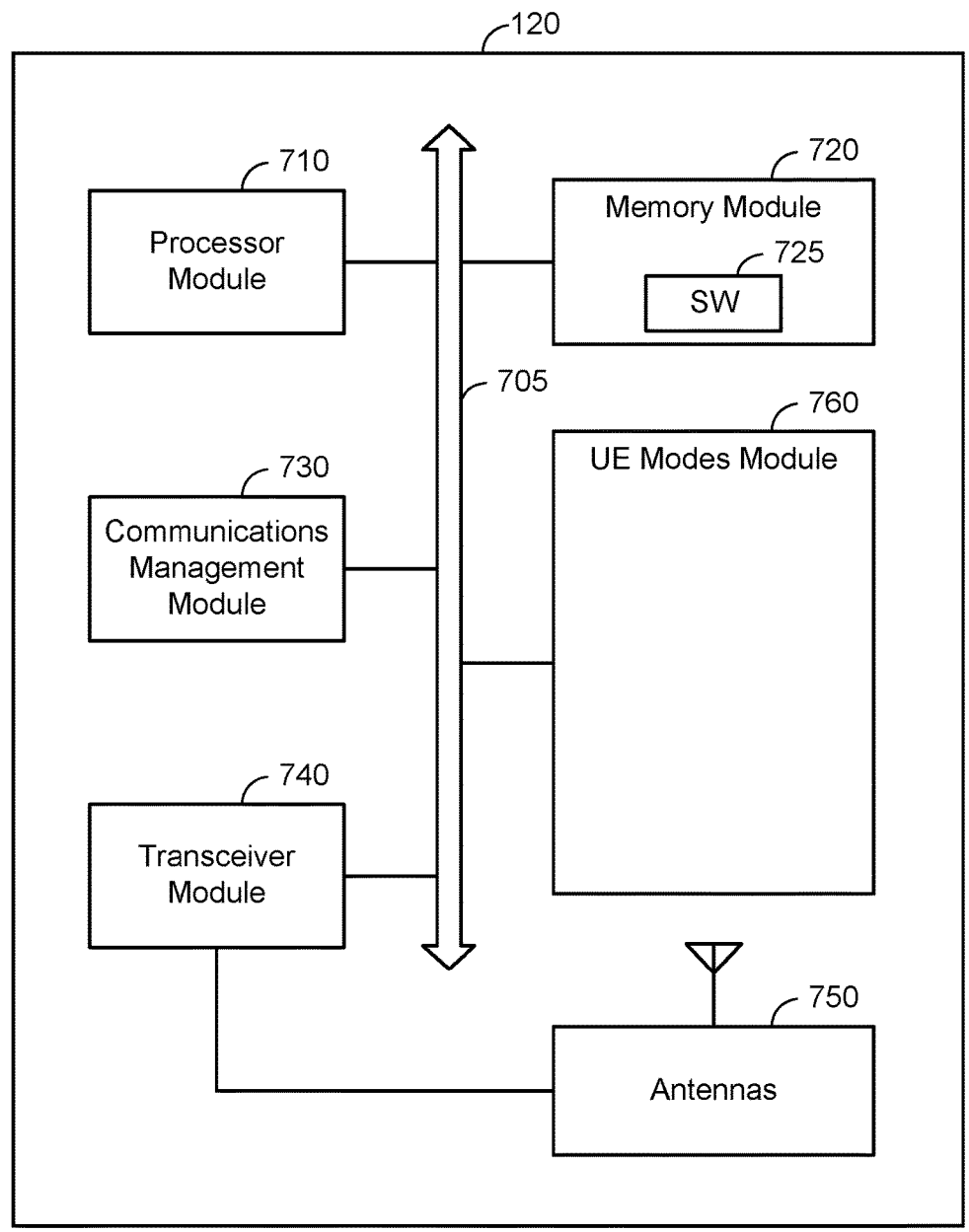
FIG. 7 illustrates an example of a UE, in accordance with certain aspects of the present disclosure.

FIG. 7 illustrates an example of a UE 120 configured to use soft-windowing in channel estimation. The UE 120 may have various other configurations and may be included in or be part of a personal computer (e.g., laptop computer, netbook computer, tablet computer, etc.), a cellular telephone, a PDA, a digital video recorder (DVR), an internet appliance, a gaming console, an e-reader, etc. The UE 120 may have an internal power supply (not shown), such as a small battery, to facilitate mobile operation. The UE 120 may be configured to implement at least some of the features and functions described above with respect to FIGS. 1-6. For example, UE 120 may be capable of performing operations set forth in FIG. 5.

The UE 120 may include a processor module 710, a memory module 720, a transceiver module 740, antennas 750, and a UE modes module 760. Each of these components may be in communication with each other, directly or indirectly, over one or more buses 705. The processor module 710 and/or the transceiver module 740 may perform or direct other components of the UE in performing operations 500, shown in FIG. 5.

The memory module 720 may include random access memory (RAM) and read-only memory (ROM). The memory module 720 may store computer-readable, computer-executable software (SW) code 725 containing instructions that are configured to, when executed, cause the processor module 710 and/or the transceiver module 740 to perform various functions described herein for using soft-windowing in receiving and decoding a channel. Alternatively, the software code 725 may not be directly executable by the processor module 710 and/or the transceiver module 740 but may be configured to cause the processor module 710 and/or the transceiver module 740 (e.g., when compiled and executed) to perform functions, such as operations 500 shown in FIG. 5, described herein.

The processor module 710 may include an intelligent hardware device, e.g., a central processing unit (CPU), a microcontroller, an application-specific integrated circuit (ASIC), etc. The processor module 710 may process information received through the transceiver module 740 and/or to be sent to the transceiver module 740 for transmission through the antennas 750.

The transceiver module 740 may be configured to communicate bi-directionally with base stations (e.g., base stations 110). The transceiver module 740 may be implemented as one or more transmitter modules and one or more separate receiver modules. The transceiver module 740 may include a modem configured to modulate packets and provide the modulated packets to the antennas 750 for transmission, and to demodulate packets received from the antennas 750. While the UE 120 may include a single antenna, there may be embodiments in which the UE 120 includes multiple antennas 750.

According to the architecture of FIG. 7, the UE 120 may further include a communications management module 730. The communications management module 730 may manage communications with various access points. The communications management module 730 may be a component of the UE 120 in communication with some or all of the other components of the UE 120 over the one or more buses 705. Alternatively, functionality of the communications management module 730 may be implemented as a component of the transceiver module 740, as a computer program product, and/or as one or more controller elements of the processor module 710.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for processing, means for indicating, and/or means for estimating, may comprise a processing system, which may include one or more processors, such as the transmit processor 320, the TX MIMO processor 330, and/or the controller/processor 340 of the BS 310 illustrated in FIG. 3, and/or the transmit processor 364, the TX MIMO processor 366, and/or the controller/processor 380 of the user equipment 350 illustrated in FIG. 3. Additionally or alternatively, means for determining, means for processing, means for indicating, and/or means for estimating may include one or more of the processor module 710, memory module 720, communications management module, and/or UE modes module in the UE 120 shown in FIG. 7. Means for transmitting and/or means for sending may comprise a transmitter, which may include the transmit processor 320, the TX MIMO processor 330, the modulators 332, the controller/processor 340, and/or the antenna(s) 334 of the BS 310 illustrated in FIG. 3, and/or the transmit processor 364, the TX MIMO processor 366, the modulators 354, the controller/processor 380, and/or the antenna(s) 352 of the user equipment 350 illustrated in FIG. 3. Additionally or alternatively, means for transmitting and/or means for sending may comprise the processor module 710, communications management module 730, UE Modes Module 760, transceiver module 740, and/or antennas 750 of the UE 120 shown in FIG. 7. Means for receiving and/or means for detecting may comprise a receiver, which may include the receive processor 358, the MIMO detector 356, the demodulators 354, the controller/processor 380, and/or the antenna(s) 352 of the UE 350 illustrated in FIG. 3, and/or the reception processor 338, the MIMO detector 336, the demodulators 332, the controller/processor 340, and/or the antenna(s) 334 of the base station 310 illustrated in FIG. 3. Additionally or alternatively, means for receiving and/or means for detecting may comprise the antennas 750, transceiver module 740, communications management module 730, UE modes module 760, and processor module 710 of the UE 120 illustrated in FIG. 7. Means for communicating may comprise a transmitter and/or a receiver, which may include the transmit processor 420, the TX MIMO processor 430, the modulators 432, the controller/processor 440, the antenna(s) 434, the receive processor 438, the MIMO detector 436, and/or the demodulators 434 of the base station 110 illustrated in FIG. 4 and/or the transmit processor 464, the TX MIMO processor 466, the modulators 454, the controller/processor 480, and/or the antenna(s) 452, the receive processor 458, the MIMO detector 456, and/or the demodulators 454 of the UE 120 illustrated in FIG. 4. Additionally or alternatively, means for communicating may comprise the processor module 710, communications management module 730, UE Modes Module 760, transceiver module 740, and/or antennas 750 of the UE 120 illustrated in FIG. 7.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

As used herein, the expression "at least one of a or b" is meant to include a, b, or the combination of both a and b.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
    determining, based on a cyclic prefix (CP) length of a channel, a timing window for sampling reference signals transmitted on the channel, wherein determining the timing window comprises calculating a mean channel energy response (CER) of samples of the channel;
    determining a set of weights to apply to samples obtained within the determined timing window, wherein each weight corresponds to a sample obtained within the determined window, wherein determining the set of weights comprises:
        determining mask values based on the determined timing window;
        multiplying each sample of the channel by a corresponding mask value to determine masked sample values;
        determining a set of threshold values based on the timing window; and
        determining the weight corresponding to each sample based on comparing the corresponding masked sample value to products determined by multiplying each of the set of threshold values by the mean CER; and
    estimating the channel by applying the weights to the corresponding samples.

2. The method of claim 1, wherein determining the timing window is further based on a maximum allowable delay of a true channel path of the channel.

3. The method of claim 1, wherein determining each weight of the set of weights is further based on a likelihood of the corresponding sample having a timing of a true channel path of the channel.

4. The method of claim 1, wherein the channel comprises a physical broadcast channel (PBCH).

5. An apparatus for wireless communications by a user equipment (UE), comprising:
    a processing system configured to:
        determine, based on a cyclic prefix (CP) length of a channel, a timing window for sampling reference signals transmitted on the channel, wherein the processing system is configured to calculate a mean channel energy response (CER) of samples of the channel as part of determining the timing window;
        determine a set of weights to apply to samples obtained within the determined timing window, wherein each weight corresponds to a sample obtained within the determined window and wherein the processing system is configured to determine the set of weights by:
            determining mask values based on the determined timing window,
            multiplying each sample of the channel by a corresponding mask value to determine masked sample values,
            determining a set of threshold values based on the timing window, and
            determining the weight corresponding to each sample based on comparing the corresponding masked sample value to products determined by multiplying each of the set of threshold values by the mean CER; and
        estimate the channel by applying the weights to the corresponding samples; and
    a memory coupled with the processing system.

6. The apparatus of claim 5, wherein the processing system is configured to determine the timing window based on a maximum allowable delay of a true channel path of the channel.

7. The apparatus of claim 5, wherein the processing system is configured to determine each weight of the set of weights based on a likelihood of the corresponding sample having a timing of a true channel path of the channel.

8. The apparatus of claim 5, wherein the channel comprises a physical broadcast channel (PBCH).

9. An apparatus for wireless communications, comprising:
    means for determining, based on a cyclic prefix (CP) length of a channel, a timing window for sampling reference signals transmitted on the channel, wherein the means for determining the timing window comprises means for calculating a mean channel energy response (CER) of samples of the channel;
    means for determining a set of weights to apply to samples obtained within the determined timing window, wherein each weight corresponds to a sample obtained within the determined window, wherein the means for determining the set of weights comprises:
        means for determining mask values based on the determined timing window;
        means for multiplying each sample of the channel by a corresponding mask value to determine masked sample values;
        means for determining a set of threshold values based on the timing window; and
        means for determining the weight corresponding to each sample based on comparing the corresponding masked sample value to products determined by multiplying each of the set of threshold values by the mean CER; and
    means for estimating the channel by applying the weights to the corresponding samples.

10. The apparatus of claim 9, wherein the means for determining the timing window comprises means for determining the timing window based on a maximum allowable delay of a true channel path of the channel.

11. The apparatus of claim 9, wherein the means for determining the set of weights comprises means for determining each weight of the set of weights based on a likelihood of the corresponding sample having a timing of a true channel path of the channel.

12. The apparatus of claim 9, wherein the channel comprises a physical broadcast channel (PBCH).

13. A non-transitory computer-readable medium for wireless communications comprising instructions that, when executed by a processor, cause the processor to perform operations comprising:
  determining, based on a cyclic prefix (CP) length of a channel, a timing window for sampling reference signals transmitted on the channel, wherein determining the timing window comprises calculating a mean channel energy response (CER) of samples of the channel;
  determining a set of weights to apply to samples obtained within the determined timing window, wherein each weight corresponds to a sample obtained within the determined window, wherein determining the set of weights comprises:
    determining mask values based on the determined timing window;
    multiplying each sample of the channel by a corresponding mask value to determine masked sample values;
    determining a set of threshold values based on the timing window; and
    determining the weight corresponding to each sample based on comparing the corresponding masked sample value to products determined by multiplying each of the set of threshold values by the mean CER; and
  estimating the channel by applying the weights to the corresponding samples.

14. The computer-readable medium of claim 13, wherein the instructions causing the processor to determine the timing window cause the processor to determine the timing window based on a maximum allowable delay of a true channel path of the channel.

15. The computer-readable medium of claim 13, wherein the instructions causing the processor to determine the set of weights cause the processor to determine each weight of the set of weights based on a likelihood of the corresponding sample having a timing of a true channel path of the channel.

16. The computer-readable medium of claim 13, wherein the channel comprises a physical broadcast channel (PBCH).

* * * * *